United States Patent Office 2,708,668
Patented May 17, 1955

2,708,668

TETRAKISAZO DYESTUFFS

Fritz Suckfüll, Leverkusen-Wiesdorf, Germany, assignor to Farbenfabriken Bayer Aktiengesellschaft, Leverkusen, Germany, a corporation of Germany No Drawing. Application April 9, 1952,
Serial No. 281,463

Claims priority, application Germany April 30, 1951

4 Claims. (Cl. 260—167)

The present invention relates to new tetrakisazo dyestuffs and to a method of making the same; more particularly it relates to tetrakisazo dyestuffs of the general formula:

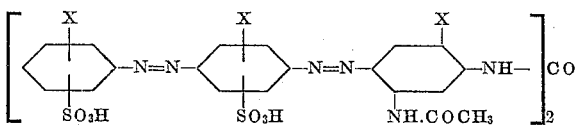

In this formula X stands for hydrogen or methyl.

The new tetrakisazo dyestuffs are obtainable by coupling a diazotized aminoazo-benzene disulfonic acid or a homologue thereof with 1-amino-3-acetylamino-benzene or 1-amino-3-acetylamino-6-methyl-benzene and converting the disazo dyestuffs thus obtained into the corresponding ureas in known manner. This can be done by condensing the amino-disazo dyestuffs with phosgene.

The new tetrakisazo dyestuffs dye cotton and fibers of regenerated cellulose red-orange shades fast to acid. Tetrakisazo dyestuffs of similar constitution are known from German Patent 223,753; in this patent, however, there are no dyestuffs mentioned containing 1-amino-3-acetylamino-benzene or its homologue as coupling component. The new dyestuffs excel these known dyestuffs in their good fastness to acids.

Example 1

35.7 parts of 4-aminoazo-benzene-3.4'-disulfonic acid are diazotized with 6.9 parts of sodium nitrite at 5° C. 15 parts of 1-amino-3-acetylamino-benzene are added to the diazo compound. Coupling is completed by adding sodium acetate, and the dyestuff is isolated. After dissolving again, the dyestuff is treated with phosgene at 40° C. until a test portion shows that the reaction is complete.

After being isolated and dried, the dyestuff represents a dark powder which easily dissolves in water. When dyed on cotton, red-orange shades are obtained having a good fastness to brightening.

The new tetrakisazo dyestuff corresponds in the form of the free acid to the following formula:

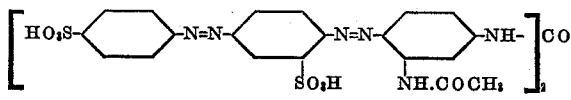

Example 2

When replacing the 1-amino-3-acetylamino-benzene of Example 1 by 16.4 parts of 1-amino-3-acetylamino-6-methylbenzene, a dyestuff is obtained which behaves similar to that obtained according to Example 1. It corresponds as free acid to the following formula:

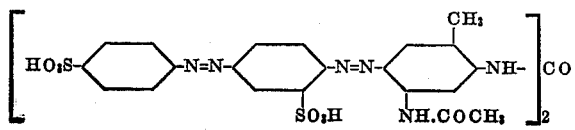

Example 3

17.3 parts of 1-aminobenzene-4-sulfonic acid are diazotized with 6.9 parts of sodium nitrite at 10° C., and the diazo compound is coupled in acetic medium with 18.7 parts of 1-amino-3-methylbenzene-6-sulfonic acid. The isolated monoazo dyestuff is further diazotized with 6.9 parts of sodium nitrite at 5° C., and the diazoazo compound is coupled in acetic medium with 15 parts of 1-amino-3-acetylamino-benzene. The aminodisazo dyestuff is, as described in Example 1, converted into the symmetric urea, isolated and dried.

The dyestuff represents a dark powder and is easily soluble in water. It dyes cotton reddish orange shades with a good fastness to brightening. The dyestuff corresponds in the form of the free acid to the formula:

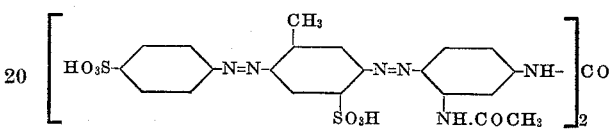

I claim:

1. Tetrakisazo dyestuffs corresponding as free acids to the general formula:

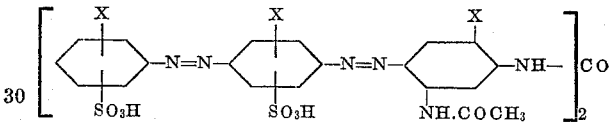

in which X stands for one of the group consisting of hydrogen and methyl, dyeing cotton and fibers of regenerated cellulose red-orange shades fast to acid.

2. The tetrakisazo dyestuff corresponding as free acid to the formula:

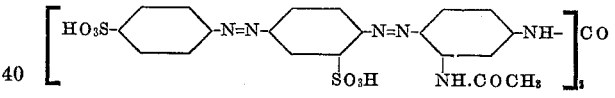

dyeing cotton and fibers of regenerated cellulose red-orange shades.

3. The tetrakisazo dyestuff corresponding as free acid to the formula:

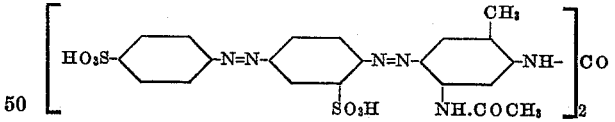

dyeing cotton and fibers of regenerated cellulose red-orange shades.

4. The tetrakisazo dyestuff corresponding as free acid to the formula:

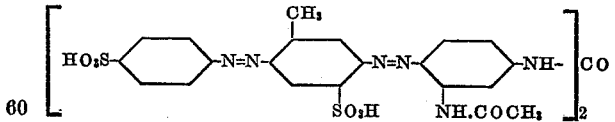

dyeing cotton and fibers of regenerated cellulose reddish orange shades.

References Cited in the file of this patent

UNITED STATES PATENTS

| Number | Name | Date |
|---|---|---|
| 978,580 | Gunther et al. | Dec. 13, 1910 |
| 2,026,920 | Taube et al. | Jan. 7, 1936 |
| 2,273,094 | Fischer et al. | Feb. 17, 1942 |
| 2,606,897 | Grandjean | Aug. 12, 1952 |